(12) United States Patent
Kisaka (10) Patent No.: US 7,315,430 B2
(45) Date of Patent: Jan. 1, 2008

(54) SERVO CONTROLLER IN MAGNETIC DISK DRIVE

(75) Inventor: Masashi Kisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 13 days.

(21) Appl. No.: 11/190,674

(22) Filed: Jul. 26, 2005

(65) Prior Publication Data

US 2006/0023343 A1 Feb. 2, 2006

(30) Foreign Application Priority Data

Jul. 27, 2004 (JP) .............................. 2004-218287

(51) Int. Cl.
*G11B 5/596* (2006.01)

(52) U.S. Cl. .................................................. 360/77.04

(58) Field of Classification Search ...................... None
See application file for complete search history.

(56) References Cited

U.S. PATENT DOCUMENTS

| | | | | |
|---|---|---|---|---|
| 4,616,276 A * | 10/1986 | Workman | ................. | 360/77.04 |
| 5,793,559 A * | 8/1998 | Shepherd et al. | ......... | 360/78.09 |
| 5,923,491 A * | 7/1999 | Kisaka et al. | ............. | 360/77.04 |
| 5,926,338 A * | 7/1999 | Jeon et al. | ............... | 360/77.04 |
| 6,141,175 A * | 10/2000 | Nazarian et al. | ......... | 360/77.04 |
| 6,615,361 B1 * | 9/2003 | Patapoutian | ................. | 713/503 |
| 6,671,119 B2 * | 12/2003 | Baumann et al. | ......... | 360/77.08 |
| 6,850,385 B1 * | 2/2005 | Woods | ..................... | 360/77.04 |
| 6,853,512 B2 * | 2/2005 | Ozawa | ..................... | 360/77.02 |
| 6,922,596 B2 * | 7/2005 | Erickson et al. | .............. | 700/54 |

FOREIGN PATENT DOCUMENTS

| | | |
|---|---|---|
| JP | 09-097481 | 4/1997 |
| JP | 11-353831 | 12/1999 |
| JP | 2002-525776 A | 8/2002 |
| JP | 2003-505818 A | 2/2003 |

* cited by examiner

*Primary Examiner*—K. Wong
(74) *Attorney, Agent, or Firm*—Townsend and Townsend and Crew LLP; Patrick Duncan (57) ABSTRACT

Embodiment of the invention inhibit an effect of repeatable runout errors without expanding servo data areas of the magnetic disk. With regard to low frequency components of positional information read by a magnetic head, which are substantially equivalent to a rotational frequency of a magnetic disk, a servo controller according to one embodiment includes: a peak filter for removing such low frequency components from the positional information; a correction module for correcting the positional information by using repeatable runout compensation data; a phase correction circuit for calculating the amount of control based on an output of the correction module; and an adding circuit for adding an output of the peak filter and an output of the phase correction circuit. The servo controller controls positioning of the magnetic head by calculating an amount of positioning control of the magnetic head based on the positional information and adding it to the amount of control calculated based on the positional information and the repeatable runout compensation data.

10 Claims, 5 Drawing Sheets

SERVO CONTROLLER IN MAGNETIC DISK DRIVE

CROSS-REFERENCES TO RELATED APPLICATIONS

This application claims priority from Japanese Patent Application No. JP2004-218287, filed Jul. 27, 2004, the entire disclosure of which is incorporated herein by reference.

BACKGROUND OF THE INVENTION

The present invention relates to a magnetic disk drive and, in particular, it relates to a servo controller for positioning a magnetic head at a target track.

On a magnetic disk mounted on a magnetic disk drive, a plurality of data tracks are formed concentrically and servo data is recorded in a radial direction of the disk in advance. The servo data is comprised of positional information such as track data, sector data and burst signals. The track data is information indicating track addresses and the sector data is information indicating sector numbers and, based on the track data read by a magnetic head, an approximate position of the magnetic head or, in other words, the data track where the magnetic head is located can be determined. Further, burst signals are comprised of a plurality of burst pattern rows, each of which has data recording areas arranged at regular intervals in the radial direction of the disk and having different phases from each other and, based on signals output from the magnetic head according to the burst pattern, an accurate position of the magnetic head, or, in other words, a deviation of the position of the magnetic head in the inner or outer side from the data track where the magnetic head is located can be detected.

Information is read from or written to the magnetic disk after the magnetic head is moved to be located at a target data track while checking the approximate position of the magnetic head based on the track data read by the magnetic head and, then, the magnetic head is positioned at the target data track accurately based on the signals output from the magnetic head according to the burst pattern, during which the magnetic disk rotates. Further, even while the information is read or written, the magnetic head is feedback-controlled so that it is positioned at a constant position with respect to the target track based on the signals output from the magnetic head according to the burst pattern.

As the data track width is reduced for high-density recording, repeatable runout (RRO) errors, which may occur because the servo data recorded on the disk is not perfect concentric circles, become a problem. In order to compensate for the RRO, a method for recording RRO compensation data at the end of servo data areas recorded on the disk as set forth in Patent Document 1 (Japanese Unexamined Patent Publication 2002-525776) is known. Further, in Patent Document 2 (Japanese Unexamined Patent Publication 2003-505818), a specific method for obtaining the RRO compensation data by measuring low frequency components is set forth.

BRIEF SUMMARY OF THE INVENTION

In the method set forth in Patent Document 1, the RRO compensation data is used for all frequency components so that the RRO components can be suppressed and the data tracks can be arranged as concentric circles centered on the center of rotation of the disk. However, in the circumstances that the servo data areas include the track data, the sector data and the burst signals as described above, user data recording areas will be decreased by further adding the RRO compensation data to the servo data areas. Further, after the servo data is written to the magnetic disk, if the magnetic disk is shifted due to disturbances such as an impact and the center of the data tracks deviates from the center of rotation of the spindle, the magnetic head will cross several data tracks after the RRO is compensated. In order to perform compensation even in such case, the RRO compensation data must further include track addresses and, as a result, the RRO compensation data recording areas will become too long.

After all, as there may be cases in which the disk is shifted after the RRO compensation value is measured and the accurate value may not always be obtained by correcting low frequencies, it is not necessary to perform the RRO compensation for the low frequencies.

It is a feature of the present invention to provide a magnetic disk drive comprising a servo controller that can inhibit an effect of repeatable runout errors without expanding servo data areas of a magnetic disk.

According to an aspect of the present invention, there is provided a magnetic disk drive including: a magnetic disk having a plurality of tracks in which a plurality of servo data areas including repeatable runout compensation data, and data recording areas between the servo data areas are formed; a spindle motor for holding and rotating the magnetic disk; a magnetic head for writing and reading data on the magnetic disk; a driving mechanism for moving the magnetic head in a radial direction of the magnetic disk; and a servo controller for calculating the amount of positioning control of the magnetic head based on positional information and the repeatable runout compensation data read by the magnetic head from the servo data areas and positioning the magnetic head at a target track on the magnetic disk. With regard to low frequency components of the positional information read by the magnetic head, which are substantially equivalent to a rotational frequency of the magnetic disk, the servo controller controls the positioning of the magnetic head by calculating the amount of positioning control of the magnetic head based on the positional information and adding it to the amount of control calculated based on the positional information and the repeatable runout compensation data.

In some embodiments, the servo controller has a peak filter and a phase correction circuit, wherein, when the positional information read by the magnetic head includes the low frequency components substantially equivalent to the rotational frequency of the magnetic disk, the peak filter prevents such low frequency components from being input to the phase correction circuit. The low frequency components substantially equivalent to the rotational frequency of the magnetic disk include harmonics of several orders. The repeatable runout compensation data is an estimated value of external noise added to the positional information read by the magnetic head.

According to another aspect of the present invention, there is provided a magnetic disk drive having: a magnetic disk having a plurality of tracks in which a plurality of servo data areas including repeatable runout compensation data, and data recording areas between the servo data areas are formed; a spindle motor for holding and rotating the magnetic disk; a magnetic head for writing and reading data on the magnetic disk; a driving mechanism for moving the magnetic head in a radial direction of the magnetic disk; and a servo controller for calculating the amount of positioning control of the magnetic head based on positional information and the repeatable runout compensation data read by the magnetic head from the servo data areas and positioning the magnetic head at a target track on the magnetic disk. With regard to low frequency components of the positional information read by the magnetic head, which occur due to deviation of the center of rotation of the magnetic disk, the servo controller controls the positioning of the magnetic head by calculating the amount of positioning control of the magnetic head based on the positional information and adding it to the amount of control calculated based on the positional information and the repeatable runout compensation data.

In some embodiments, the servo controller has a peak filter and a phase correction circuit, wherein, when the positional information read by the magnetic head includes the low frequency components that occur due to the deviation of the center of rotation of the magnetic disk, the peak filter prevents such low frequency components from being input to the phase correction circuit. The low frequency components that occur due to the deviation of the center of rotation of the magnetic disk include harmonics of several orders.

According to another aspect of the present invention, there is provided a magnetic disk drive having: a magnetic disk having a plurality of tracks in which a plurality of servo data areas including repeatable runout compensation data, and data recording areas between the servo data areas are formed; a spindle motor for holding and rotating the magnetic disk; a magnetic head for writing and reading data on the magnetic disk; a driving mechanism for moving the magnetic head in a radial direction of the magnetic disk; and a servo controller for calculating the amount of positioning control of the magnetic head based on positional information and the repeatable runout compensation data read by the magnetic head from the servo data areas and positioning the magnetic head at a target track on the magnetic disk.

With regard to low frequency components of the positional information read by the magnetic head, which are substantially equivalent to a rotational frequency of the magnetic disk, the servo controller has: a peak filter for removing such low frequency components from the positional information; a correction module for correcting the positional information by using the repeatable runout compensation data; a phase correction circuit for calculating the amount of control based on an output of the correction module; and an adding circuit for adding an output of the peak filter and an output of the phase correction circuit.

In some embodiments, the peak filter has narrow band characteristics that exhibit high gain for low frequencies that is substantially equivalent to the rotational frequency of the magnetic disk and its harmonics of several order. When the peak filter is expressed by a transfer function, the numerator is an FIR filter.

According to the present invention, an effect of the repeatable runout errors can be inhibited without expanding servo data areas of the magnetic disk.

DETAILED DESCRIPTION OF THE INVENTION

Figure 7:
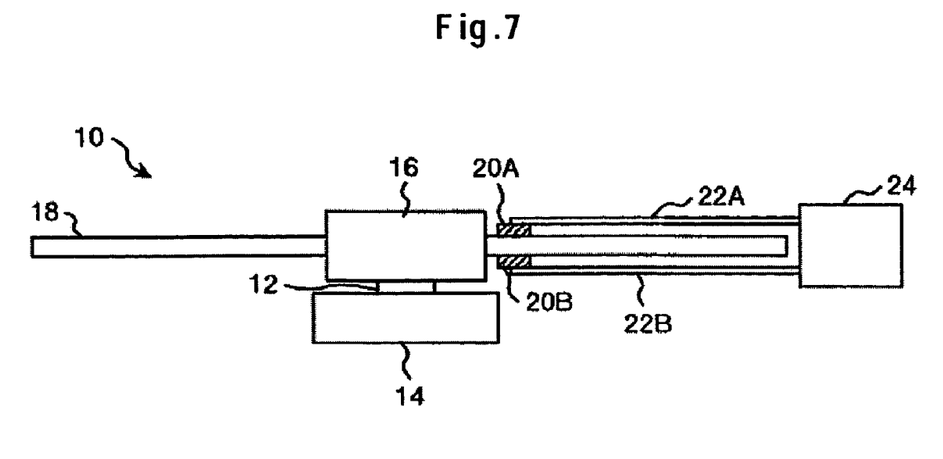
FIG. 7 is a schematic diagram of a magnetic disk drive according to an embodiment of the present invention.

FIG. 7 shows a configuration of a magnetic disk drive 10 according to an embodiment of the present invention. The magnetic disk drive 10 is equipped with a spindle motor 14 and, when energized, a rotating shaft 12 of the spindle motor 14 rotates at a constant speed. A motor hub 16 is attached to the rotating shaft 12 so that their axis lines coincide with each other and, then, a magnetic disk 18 is attached to the circumference of the motor hub 16.

In the magnetic disk 18, magnetic recording media (recording surfaces) are formed on both sides of its disk-shaped substrate and a hole having a diameter substantially equal to an outer diameter of the motor hub 16 is made at its center. The motor hub 16 is inserted into this hole so that the magnetic disk 18 is fixed to the circumferential surface of the motor hub 16. When the magnetic disk drive 10 is energized and the rotating shaft 12 is rotated by the spindle motor 14, the magnetic disk 18 rotates integrally with the motor hub 16.

Further, the magnetic disk drive 10 is equipped with magnetic heads 20A and 20B provided corresponding to each recording surface of the magnetic disk 18. Each of the magnetic heads 20A and 20B (also designated collectively as the magnetic head 20 in this specification) is comprised of: a read head that reads information by using an MR device; and an inductive write head that writes information. Each of the magnetic heads 20A and 20B is attached to a tip of a respective one of arms 22A and 22B (22) and held at positions slightly apart from the respective recording surfaces of the magnetic disk 18. The arms 22A and 22B are attached to a drive unit 24 at the ends opposite to those attached to the magnetic heads 20A and 20B, respectively.

The driving unit 24 is equipped with a voice coil motor (VCM) for rotating the arms 22A and 22B and, as the VCM is driven, the arms 22A and 22B are rotated to move the magnetic heads 20A and 20B in a radial direction of the magnetic disk 18. It allows the magnetic heads 20A and 20B to be positioned at target positions on the magnetic disk 18.

Figure 8:
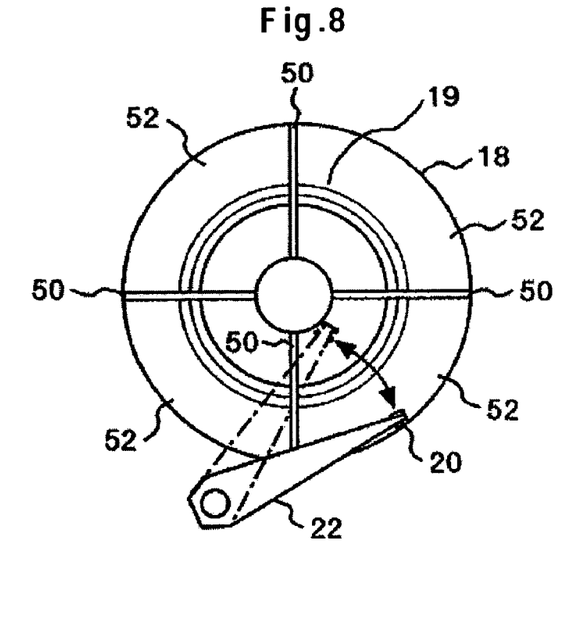
FIG. 8 is a plan view of a recording surface of a magnetic disk.

As shown in FIG. 8, on each recording surface of the magnetic disk 18, a plurality of data tracks 19 are formed in a circumferential direction of the magnetic disk 18 and, in each data track 19, servo data areas 50 are formed radially in the radial direction. User data areas 52 are disposed between the servo data areas 50 in the data tracks 19.

Figure 9:
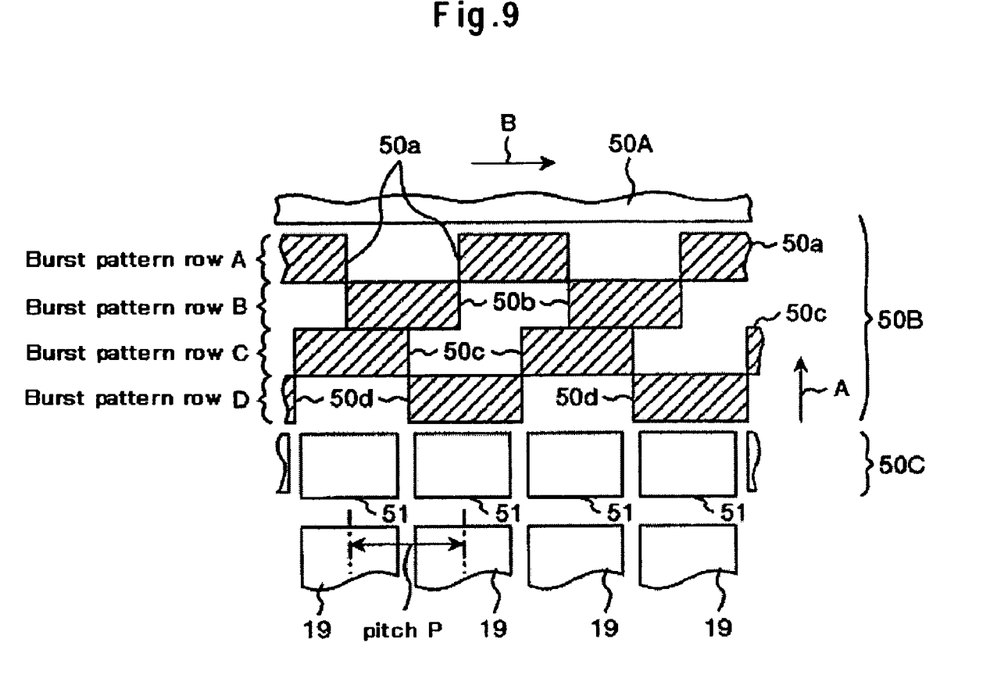
FIG. 9 is a diagram showing a portion of a servo data area.

FIG. 9 shows a portion of the servo data area 50. The servo data area 50 includes a track identification information recording area 50A, a burst pattern recording area 50B, and a repeatable runout (RRO) compensation data recording area 50C. In the track identification information recording area 50A, track identification information that indicates track addresses of each data track 19 in Gray code is recorded. Then, in the burst pattern recording area 50B, a burst pattern is recorded. The burst pattern consists of four burst pattern rows A-D that are arranged in an arrangement direction of the data tracks 19 (in a direction of arrow B) or, in other words, in the radial direction of the magnetic disk 18. In each signal recording area 50a-50d constituting the burst pattern rows A-D, respectively, both a dimension in the radial direction of the magnetic disk 18 and a clearance from the adjacent signal recording area are equal to a pitch P of each data track 19.

The signal recording areas 50a of the burst pattern row A and the signal recording area 50b of the burst pattern row B are arranged in a staggered manner in the radial direction of the magnetic disk 18 and both ends of each area in the radial direction of the magnetic disk 18 correspond to the width-direction center of the data tracks 19 and, here, the burst pattern rows A and B are formed by the fact that signals are recorded in each area. On the other hand, the signal recording areas 50c of the burst pattern row C and the signal recording area 50d of the burst pattern row D are arranged in a staggered manner in the radial direction of the magnetic disk 18 and both ends of each area in the radial direction of the magnetic disk 18 correspond to boundaries between the adjacent data tracks and, here, the burst pattern rows C and D are formed by the fact that signals are recorded in each area.

In the repeatable runout (RRO) compensation data recording area 50C, RRO compensation data 51 for compensating the RRO is recorded. The RRO compensation data 51 is obtained by calculating movement of the magnetic head with respect to an inertial coordinate system from a measurable positional error signal and adding the movement of the magnetic head to the measurable positional error signal.

In the user data areas 52, a plurality of data tracks 19 are formed concentrically with the pitch P. The magnetic head 20 reads and writes information on each data track 19 in the circumferential direction of the magnetic disk 18 (in a direction of arrow A).

Figure 10:
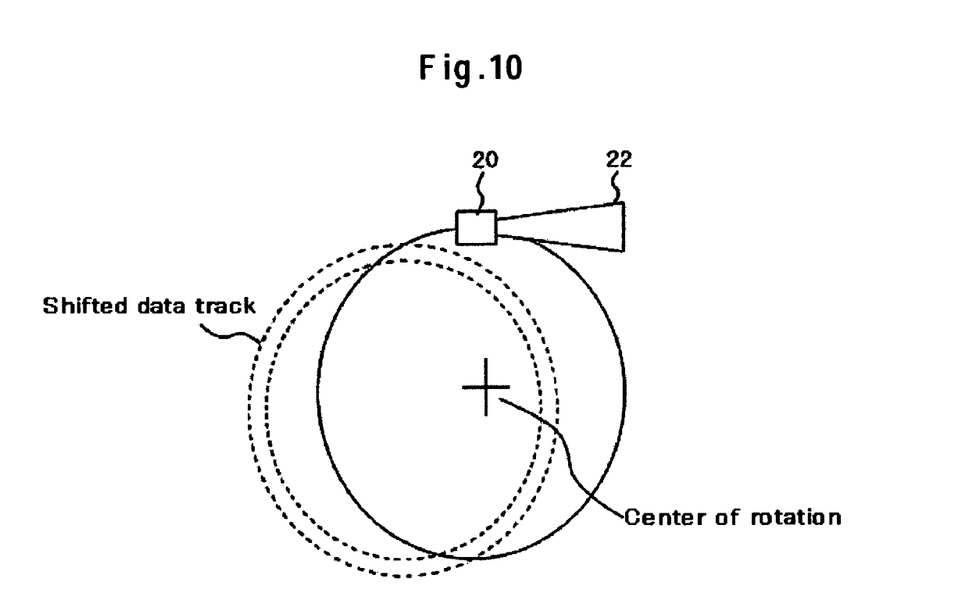
FIG. 10 is a diagram showing a state in which the magnetic disk is shifted by disturbances such as an impact.

The present invention aims at providing a servo controller that performs positioning of the magnetic head accurately without increasing the amount of the RRO compensation data described above even when the magnetic disk 18 is shifted due to disturbances such as an impact and the center of the data tracks 19 deviates from the center of rotation of the motor hub 16, as shown in FIG. 10. An exemplary implementation of this servo controller will be described with reference to FIGS. 1-6.

Figure 1:
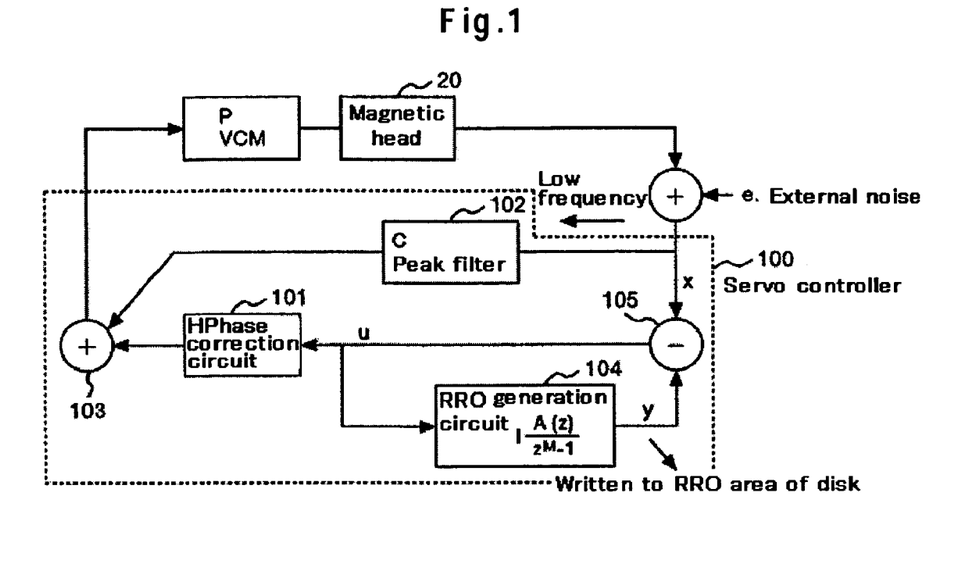
FIG. 1 is a block diagram of a servo controller according to an embodiment of the present invention.

FIG. 1 is a block diagram of a servo controller 100 that controls magnetic head 20 so as to follow the data tracks 19. The servo controller 100 includes: a phase correction circuit (H) 101; a peak filter (C) 102; an adder 103; an RRO generation circuit 104; and a subtractor 105 (correction module). While a control current for driving the VCM (P) is output from the adder 103 and input to the VCM, a servo data signal (positional information) read by the magnetic head 20, the movement of which is controlled by the VCM, is fed back to the servo controller 100 as a signal x, to which external noise e such as RRO or an impact is added.

In normal operation to read and write information, as the RRO generation circuit 104 is not used, the subtractor 105 subtracts RRO compensation data y from the positional information signal x resulting from the servo data signal read by the magnetic head 20. Thus, a positional information signal u in which the RRO is corrected is output to the phase correction circuit 101.

The phase correction circuit 101 receives the positional information signal u from the subtractor 105, detects deviation of the current position of the magnetic disk 20 from its target position and, then, calculates movement of the magnetic head 20 (the amount of control by the driver unit 24) and supplies it to the VCM as the control current.

Figure 2:
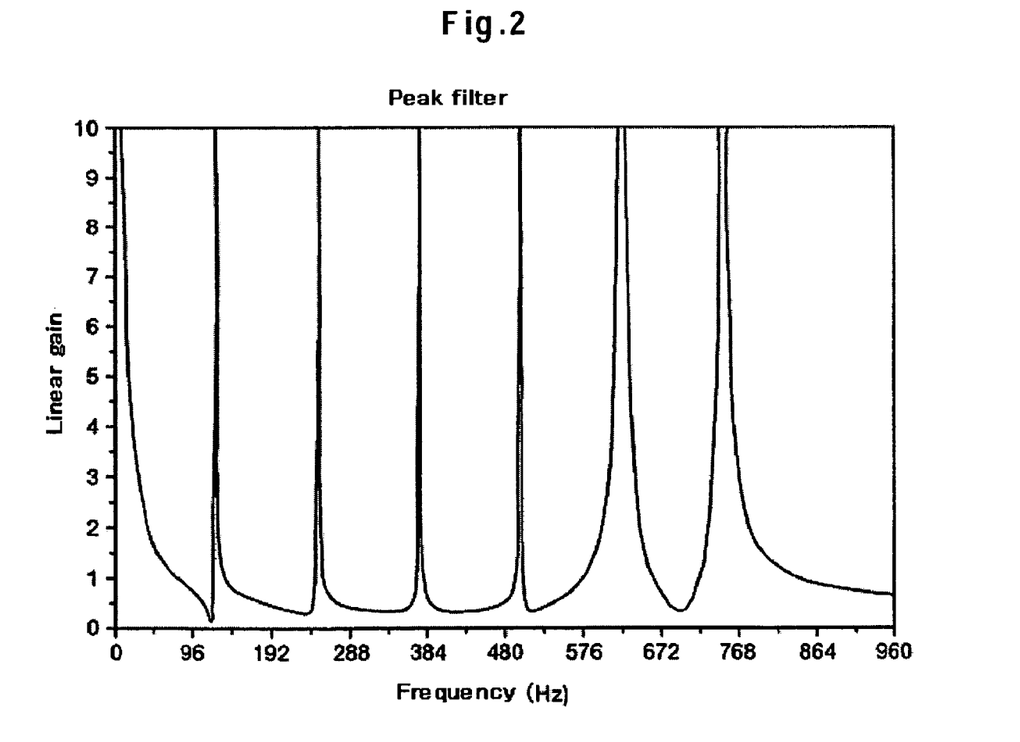
FIG. 2 is a diagram showing a frequency characteristic of a peak filter of the servo controller.

In the case of the magnetic disk drive 10 having a rotational frequency of 120 Hz, the peak filter 102 has narrow band characteristics that exhibit high gain for frequencies up to the sixth order, as shown in FIG. 2. Therefore, low frequency components generated when the magnetic disk 18 is shifted as shown in FIG. 10 are removed by the peak filter 102 and, as a result, are not input to the phase correction circuit 101. Based on the servo data signal from which the low frequency components such as those generated when the magnetic disk 18 is shifted are removed, the phase correction circuit 101 performs servo control of the magnetic head 20 so as to allow the magnetic head 20 to approach target tracks accurately.

Due to the effect of the peak filter 102, the track identification information and the burst pattern can be used to allow the magnetic head 20 to follow the low frequencies generated when the magnetic disk 18 is shifted. Therefore, the RRO compensation data do not have to include the low frequency components and track addresses.

Figure 3:
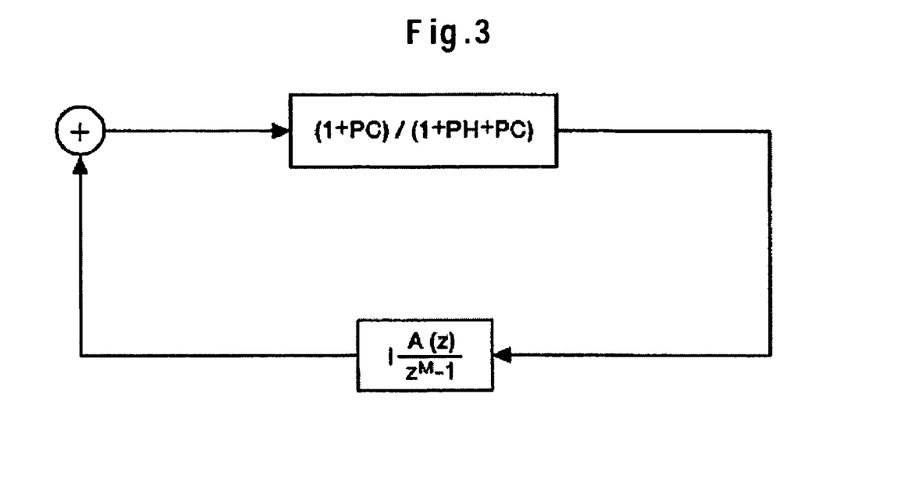
FIG. 3 is a block diagram equivalent to FIG. 1 in normal operation.

When the RRO correction data is measured, the block diagram of FIG. 1 can be expressed as a block diagram of FIG. 3. A(z) can be expressed by a stable polynomial of z and determined for system stability. At this time, assuming that harmonics of the rotational frequency are $\omega k$ (k=1, 2, ...), a stable system can be designed by satisfying the following expression:

$$|\angle A(e^{j\omega k}) - P_k| < \phi$$

where, $\angle$: an angle in the complex plane $$P_k \equiv \angle \left. \frac{1+PC}{1+PH+PC} \right|_{\omega = \omega_k} \quad \text{[Expression 1]}$$

$$\Phi = \frac{\pi}{4} \quad \text{[Expression 2]}$$

1 in FIG. 3 is a positive small constant and its value is determined so that a Nyquist diagram of the open loop function of this figure does not pass through the point (−1, 0).

Figure 4:
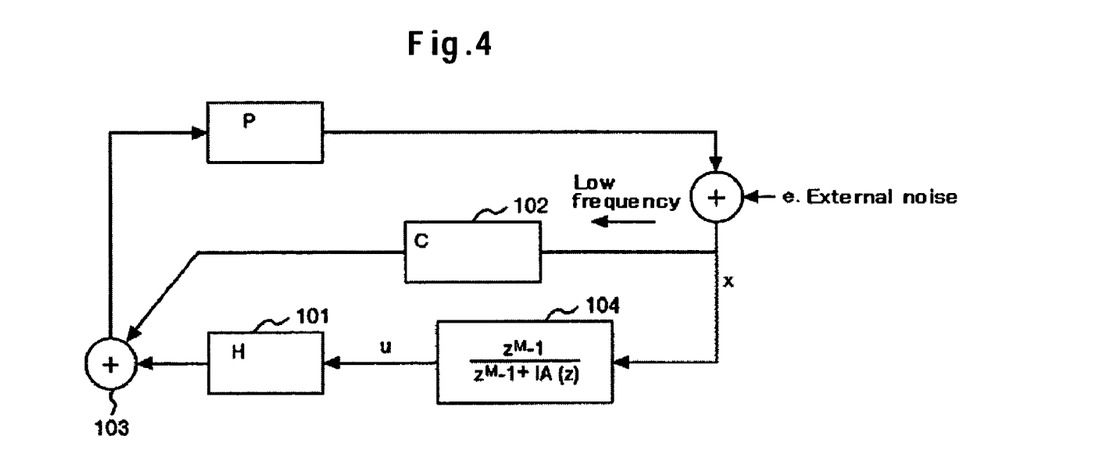
FIG. 4 is a block diagram equivalent to FIG. 1 when an RRO compensation value is generated or updated.

Next, the case in which the RRO compensation data is generated or modified will be described. When the RRO compensation data is generated or modified, the RRO generation circuit 104 in FIG. 1 is operated. FIG. 4 shows a block diagram equivalent to FIG. 1 at this time. In a steady state, as $Z^M - 1$ in the RRO generation circuit 104 does not pass all frequency components, its output u is zero. At this time, x=e/(1+PC) holds and, therefore, if PC is sufficiently small, e can be found by knowing x. In this connection, low frequency components are not input to x due to the effect of the peak filter 102 and, therefore, not included. Because u is equal to zero, x is equal to y and, therefore, the RRO correction value can be found by knowing y.

Even though C has narrow band characteristics, C may affect harmonics several orders higher than the peak frequency and, as a result, P and C may be increased and errors may occur in estimation of e. In such case, such frequency components may be removed by composing an FIR filter that operates off-line without time delay.

After the RRO compensation value y is measured, its value is written to the RRO compensation data recording area 50C of the magnetic disk 18 as the RRO compensation data 51. Alternatively, the RRO compensation data 51 may be written to memory such as Flash ROM. The RRO compensation is performed by reading the RRO compensation data 51 for each sector and giving it as y in FIG. 1. Further, as y is an estimated value of the disturbances e actually, C and H do not have to be completely the same as those when the RRO compensation value is measured.

According to the embodiment described above, the RRO compensation can be performed while excluding RRO in unnecessary low frequencies. Therefore, the magnetic head can be positioned accurately without expanding the RRO compensation data.

Figure 5:
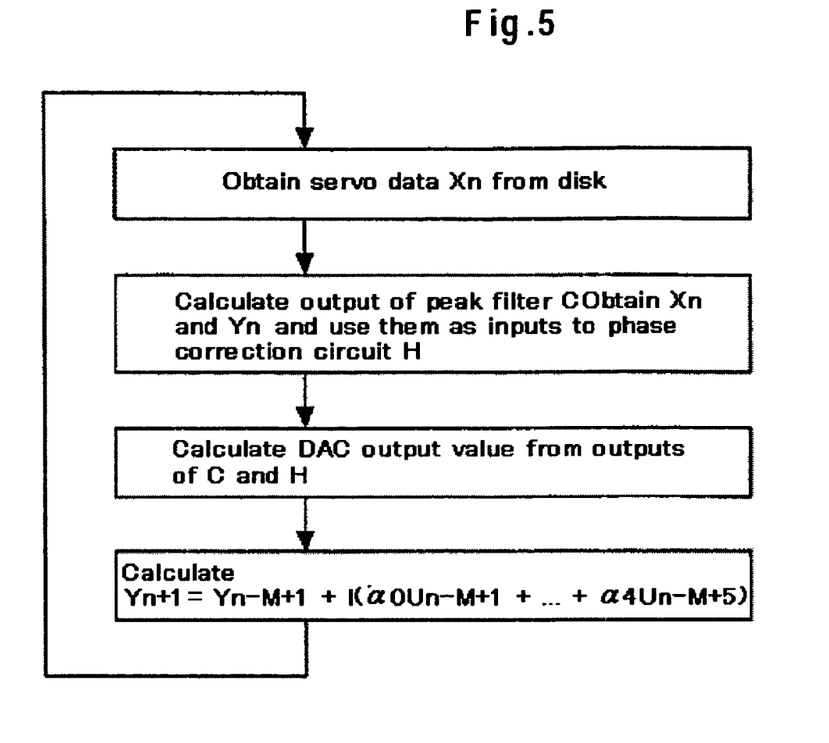
FIG. 5 is a flow chart showing a process when the RRO compensation value of the servo controller is generated or updated.

FIG. 5 shows a flow chart of the process for generating or updating the RRO compensation value y described above. Here, A(z) is calculated by the expression:

$$A(z) = \alpha_0 + \alpha_1 z + \alpha_2 z^2 + \alpha_3 z^3 + \alpha_4 z^4.$$

The process includes obtaining servo data Xn from the disk; calculating output of the peak filter C; obtaining Xn and Yn and using them as inputs to the phase correction circuit H; calculating DAC output value from the outputs of C and H; and calculating Yn+1.

Figure 6:
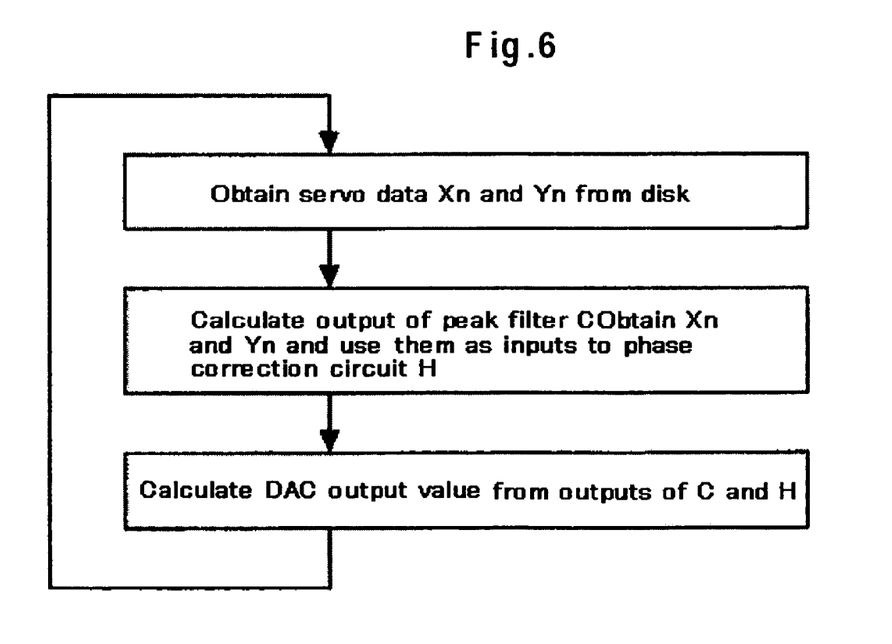
FIG. 6 is a flow chart showing a process in normal operation of the servo controller.

FIG. 6 shows a flow chart of the process in normal operation. The process includes obtaining servo data Xn and Yn from the disk; calculating output of the peak filter C; obtaining Xn and Yn and using them as inputs to the phase correction circuit H; and calculating DAC output value from the outputs of C and H.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
a magnetic disk having a plurality of tracks in which a plurality of servo data areas and data recording areas between the servo data areas are formed;
a spindle motor configured to hold and rotate the magnetic disk;
a magnetic head for writing and reading data on said magnetic disk;
a driving unit configured to move the magnetic head in a radial direction of said magnetic disk; and
a servo controller configured to calculate the amount of positioning control of said magnetic head based on positional information and on repeatable runout compensation data received by said magnetic head from a flash memory and position said magnetic head at a target track on said magnetic disk;
wherein, with regard to low frequency components of said positional information read by said magnetic head, which occur in the case that the center of rotation of said magnetic disk deviates more than one track, said servo controller controls the positioning of said magnetic head by calculating the amount of positioning control of said magnetic head to remove said low frequency components from said positional information and adding it to said amount of control calculated based on said positional information and said repeatable runout compensation data.

2. The magnetic disk drive according to claim 1, wherein said servo controller has a peak filter and a phase correction circuit and wherein, when the positional information read by said magnetic head includes the low frequency components substantially equivalent to the rotational frequency of said magnetic disk, said peak filter prevents said low frequency components from being input to said phase correction circuit.

3. The magnetic disk drive according to claim 2, wherein the low frequency components substantially equivalent to the rotational frequency of said magnetic disk include harmonics of several orders.

4. The magnetic disk drive according to claim 3, wherein said repeatable runout compensation data is an estimated value of external noise added to the positional information read by said magnetic head.

5. The magnetic disk drive according to claim 2, wherein said repeatable runout compensation data is an estimated value of external noise added to the positional information read by said magnetic head.

6. The magnetic disk drive according to claim 1, wherein the low frequency components substantially equivalent to the rotational frequency of said magnetic disk include harmonics of several orders.

7. The magnetic disk drive according to claim 1, wherein said repeatable runout compensation data is an estimated value of external noise added to the positional information read by said magnetic head.

8. A magnetic disk drive comprising:
a magnetic disk having a plurality of tracks in which a plurality of servo data areas and data recording areas between the servo data areas are formed;
a spindle motor configured to hold and rotate the magnetic disk;
a magnetic head for writing and reading data on said magnetic disk;
a driving unit configured to move the magnetic head in a radial direction of said magnetic disk; and
a servo controller configured to calculate the amount of positioning control of said magnetic head based on positional information and on repeatable runout compensation data received by said magnetic head from a flash memory and position said magnetic head at a target track on said magnetic disk;
wherein, with regard to low frequency components of said positional information read by said magnetic head, which occur in the case that the center of rotation of said magnetic disk deviates more than one track, said servo controller has: a peak filter for removing said low frequency components from said positional information; a correction module configured to correct said positional information by using said repeatable runout compensation data; a phase correction circuit configured to calculate the amount of control based on an output of the correction module; and an adding circuit configured to add an output of said peak filter and an output of said phase correction circuit.

9. The magnetic disk drive according to claim 8, wherein said peak filter has narrow band characteristics that exhibit high gain for low frequencies that is substantially equivalent to the rotational frequency of said magnetic disk and said magnetic disk's harmonics of several order.

10. The magnetic disk drive according to claim 9, wherein, when said peak filter is expressed by a transfer function, the numerator is the transfer function of an FIR filter.

* * * * *